United States Patent [19]

Banks

[11] 4,432,149

[45] Feb. 21, 1984

[54] CALENDER IRONING MACHINE WITH ADJUSTABLE ROLL PRESSURE

[75] Inventor: Clifford G. Banks, Sunderland, England

[73] Assignee: Neil and Spencer Limited, United Kingdom

[21] Appl. No.: 256,026

[22] Filed: Apr. 21, 1981

[30] Foreign Application Priority Data

Nov. 27, 1980 [GB] United Kingdom ............... 8038148

[51] Int. Cl.³ .......................................... D06F 65/10
[52] U.S. Cl. ...................................... 38/55; 100/49
[58] Field of Search ................. 38/55, 44, 47, 48, 49, 38/51, 52, 53, 56, 57, 58, 59, 60, 62; 100/170, 49; 66/166

[56] References Cited

U.S. PATENT DOCUMENTS

| | | | |
|---|---|---|---|
| 2,936,602 | 5/1960 | Blackburn et al. | 66/166 |
| 3,157,723 | 11/1964 | Hochberg | 38/56 X |
| 3,200,853 | 8/1965 | Koyder et al. | 66/166 X |
| 3,484,966 | 12/1969 | Gruner et al. | 38/55 |
| 4,002,114 | 1/1977 | Guttinger | 100/49 |

*Primary Examiner*—Werner H. Schroeder
*Assistant Examiner*—Andrew M. Falik
*Attorney, Agent, or Firm*—Steele, Gould & Fried

[57] ABSTRACT

A multi-roll calender ironing machine for laundry flatwork comprises a plurality of heated ironing beds, each defining a concave ironing surface which cooperates with a padded ironing roller, whereby a laundry workpiece is fed into the nip between the roller and ironing surface in order to perform the ironing operation. Pneumatic actuating cylinders urge the ironing bed towards the roller in an adjustable manner so as to vary contact roller to ironing surface pressure. Micro-switch units determine the presence or absence of laundry workpiece en route to the ironing roller and operate the actuating cylinders whereby a relatively high roller to concave surface pressure is provided when a workpiece is present and a relatively low roller to concave surface pressure is provided when a workpiece is absent.

6 Claims, 2 Drawing Figures

CALENDER IRONING MACHINE WITH ADJUSTABLE ROLL PRESSURE

BACKGROUND TO THE INVENTION

This invention relates to calendar ironing machines.

The invention is concerned with calendar ironing machines of the type comprising at least one heated ironing bed defining a concave ironing surface which cooperates with a padded ironing roller rotatable therein whereby a laundry flatwork piece is fed between the roller and the heated concave surface of the bed, so as to perform the ironing operation.

Proposals have been made whereby the roller is moved well away from the concave surface or vice versa when ironing is not taking place, so as to prevent overheating and thereby damage by scorching of the roller padding.

The present invention seeks to provide a method of controlling economically the amount of power consumed by a calendar ironing machine. The invention also seeks to reduce wear of the roller padding, as well as to reduce the risk of scorching the padding.

SUMMARIES OF THE INVENTION

According to the present invention, a calendar ironing machine of the type comprising at least one heated ironing bed defining a concave ironing surface cooperating with a padded ironing roller rotatable within the concavity of the surface, comprises actuating means for creating relative movement between the padded roller and the concave surface so as to vary contact pressure therebetween, sensing means for determining the presence or absence of a laundry workpiece en route to the roller, and pressure control means for operating the actuating means whereby a relatively high padded roller/concave surface pressure is provided when a workpiece is present and a relatively low pressure is provided when a workpiece is absent.

The invention also comprises a method of operating a calendar ironing machine of the aforementioned type, comprising determining the presence or absence of a laundry workpiece en route to the roller, and changing the padded roller/concave surface pressure from a relatively high level when a workpiece is present to a relatively low level when a workpiece is absent.

As used herein, the term "heated", as applied to the ironing bed, includes "heatable", i.e. capable of being heated.

BRIEF DESCRIPTION OF THE DRAWINGS

The two aspects of the invention will now be described, by way of example only, with reference to the accompanying drawings, wherein.

DETAILED DESCRIPTION OF THE PREFERRED EMBODIMENT

Figures 1, 2:
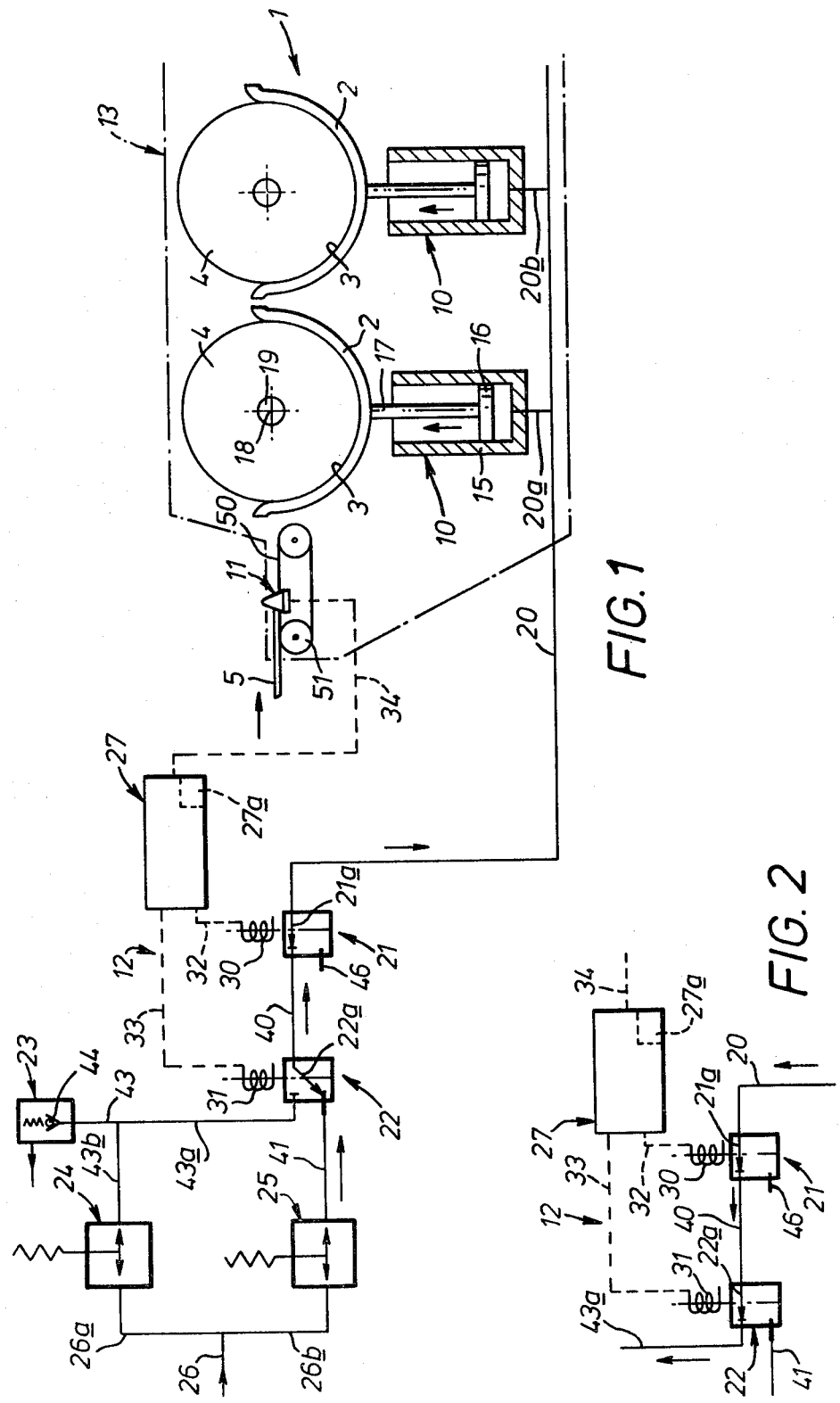
FIG. 1 provides a semi-diagrammatic illustration of a calender ironing machine during one mode of operation.
FIG. 2 illustrates part of the machine during an alternative mode of operation.

With reference to FIG. 1, a multi-roll calendar ironing machine 1 for laundry flatwork comprises a plurality of heated ironing beds 2, each defining a concave ironing surface 3 which cooperates with a padded and therefore resilient ironing roller 4 rotatable within the concavity of the surface, whereby a laundry workpiece 5 is fed between the roller 4 and heated concave surface 3, so as to perform the ironing operation. Roller 4 is driven in a continuous manner by an electric motor (not shown).

The machine 1 may actually be provided with more than two roller/bed units, (for example, 1 to 6), but only two are illustrated herein, for reasons of convenience.

The rollers 4 are covered with a compressible padding material and the ironer beds 2 are highly polished. The beds 2 are heated by steam or oil.

The machine 1 further comprises fluid-operated actuating means in the form of paired pneumatic cylinder units 10, for creating relative movement between the rollers 4 and their associated concave surfaces 3 so as to vary contact pressure therebetween, sensing means in the form of micro-switch units 11 for determining the presence or absence of the workpiece 5 en route to the ironing roller 4 and pressure control means, generally indicated at 12, for operating the pneumatic cylinder units 10 whereby a relatively high roller/concave surface pressure is provided when workpiece 5 is present and a relatively low roller/concave surface pressure is provided when the workpiece is absent. The machine 1 is disposed within a casing 13.

Each cylinder unit 10 comprises a cylinder 15, a piston 16, and a piston rod 17. Each roller 4 is rotatable about a substantially horizontal and stationary axis 18. Relative movement between each roller 4 and its associated bed 2 is provided by substantially vertical movement of the bed by a pair of units 10, the piston rods 17 of which are connected to lug-like extensions (not shown) at the opposite ends of the bed 2.

The surface of the body of a roller 4 is covered with small-diameter compression springs. The springs are disposed between the roller body and the padding. The resilient arrangement results in a roller having an excellent ironing quality.

The concave surfaces 3 of the ironer beds 2 are of polished boiler plate.

Pneumatic supply/exhaust lines 20 with branches 20a, 20b connect the lower interiors of cylinders 15 with a control or isolating valve 21 forming part of control means 12. Also forming part of control means 12 is a bed pressure selector valve 22, a quick exhaust valve 23, a low pressure regulator unit 24, a high pressure regulator unit 25, a high pressure air supply source 26, and a valve controller 27. Control and selector valves 21, 22 are operated by solenoids 30, 31 respectively, under the control of controller 27, by way of electrical signal lines 32, 33. The controller 27 is connected to micro-switch units 11 by way of electrical signal lines 34. A timer 27a forms part of the controller 27.

Valve 22 is connected to valve 21 by way of pneumatic line 40. High pressure source 26 is connected to pressure regulators 24 and 25 by branch lines 26a and 26b respectively. Valve 22 is connected to regulator 25 by a pneumatic line 41 and exhaust valve 23 is connected to valve 22 and regulator 24 by a pneumatic line 43 with branches 43a and 43b respectively.

Valves 21 and 22 have movable valve members 21a and 22a respectively. Valve member 21a can be moved from a position whereby lines 20 and 40 are interconnected, (as in FIG. 1), or to an alternative position wherein line 20 is connected to atmosphere by way of vent 46. Valve member 22a can be moved from a position whereby lines 40 and 41 are interconnected, (as in FIG. 1), or to an alternative position (see FIG. 2) wherein line 40 is connected to exhaust branch line 43a.

Exhaust valve 23 is of the pressure relief type, comprising spring-loaded valve member 44.

The workpiece 5 is fed to the machine 1 by a plurality of laterally-disposed endless guide tapes or bands 50 mounted on rollers 51, at least one of which is driven. The bands 50 are spaced slightly apart from each other, and the operative portions of the micro-switch units 11 are disposed within at least some of the gaps, whereby contact between the "leading" edge of the workpiece 5 and the operative portions of at least one of the switch units 11 trigger the latter.

In operation, pressure source 26 provides a mains air supply of approximately 90 psi which is fed to both "high" and "low" branch lines 26b, 26a. The settings of the high (25) and low (24) regulators are 75–85 psi and 40 psi respectively. In the "work" mode of the machine 1, the presence of the workpiece 5 is sensed by contact between the workpiece and one or more of the micro-switch units 11. The unit or units 11 then cause controller 27 to energise solenoid 30 and to de-energise solenoid 31 whereby valves 21, 22 are caused to connect pneumatic cylinder units 10 with the relatively "high" pressure (75–85 psi) airline 41, as shown in FIG. 1. Relatively high pressure air then passes through the valves 22 and 21 to the pneumatic cylinder units 10 whereby the ironer beds 2 are brought into contact with ironer rollers 4 at the desired ironing pressure. Ironing then takes place at a relatively high pressure, approximately 85 psi working pressure in cylinder unit 10, which is equivalent to a 0.8 psi contact pressure between roller 4 and concave surface 3. The workpiece 5 passes through the machine at various speeds, depending on the number of rollers 4 employed, between a range of 30 to 120 ft. per minute.

When the "trailing" end of the workpiece 5 has passed over the operative portions of the micro-switches 11, the timer within the controller 27, which is set in accordance with an assessed period of workpiece passage through the machine 1, causes energisation of solenoid 31 and maintains energisation of solenoid 30, whereby valve member 22a is caused to assume the position illustrated in FIG. 2, the position of valve member 21a remaining unaltered. The change in position of valve member 22a results in sufficient air in line 20 and thereby cylinders 10, to be exhausted to reduce the working pressure to about 40 psi. The "excess" air is rapidly exhausted to atmosphere by way of exhaust valve 23, which is set to close, at about 41–42 psi.

This low working pressure in cylinder unit 10 is sufficient to maintain the ironing bed 2 in contiguous relationship with the roller 4 above.

Thus a relatively low or "economy" roller 4/concave surface 3 contact pressure is reduced to almost zero as the roller 4 continues to rotate.

The reduction in roller 4/concave surface 3 contact pressure (to almost zero) results in a corresponding reduction of friction therebetween, which gives rise to a substantial reduction, (approximately 50%), in the electrical power consumed by the motor driving the roller 4.

The reduction in roller 4/concave surface 3 pressure during the "non-work" or "economy" mode of the machine 1 has another advantage, namely it avoids undue overheating of the roller paddings, as the paddings are now only in relatively light contact with the heated beds 2 as the rollers 4 rotate. The lighter contact also means reduced wear of the padding.

The timer of the controller 27 may be of the "electronic delay on de-energising" type, so that if the gap to the next workpiece 5 is less than the effective length of the ironing machine 1, the first signal to switch to power saving is cancelled and the circuit is once more waiting for a production gap. Therefore, any production gap that exceeds the effective length of the machine for example, will automatically place the machine in the "economy" mode, without any action from the machine operators.

Alternatively, the timer of the controller 27 may be replaced by a counter device which assessed that a workpiece has passed through the machine by counting revolutions of the ironer rollers 4 and then causes the roller 4/concave surface 3 contact pressure to be reduced to the economy setting.

Furthermore, in addition to the breaks in feeding workpieces to the machine, there are natural breaks for tea, etc. In delays as long as thirty minutes whilst no workpieces are passing through the machine, ironer rollers heretofore have continued to be driven and ironing pressure between bed and rollers has been maintained substantially constant. It will be appreciated, therefore, that considerable savings can be made in the case of the present invention, not only in energy, but also in wear and tear of the roller padding.

When the machine 1 is shut down, the rollers 4 are stopped and the supply of heat to beds 2 terminated. Furthermore, the controller 27 is caused to de-energise solenoid 30 so as to connect valve member 21a of valve 21 to atmosphere by way of vent 46. Line 20 is thus fully exhausted and the beds 2 are lowered well away from the rollers 4.

In a modification, the rotational axes 18 of the rollers 4 are made movable towards and away from stationary beds 2.

I claim:

1. A calendar ironing machine of the type comprising at least one heated ironing bed defining a concave ironing surface cooperating with a padded ironing roller rotatable within the concavity of the surface, comprising actuating means for creating relative movement between the padded roller and the concave surface so as to vary contact pressure therebetween, sensing means for detemining the presence or absence of a laundry workpiece en route to the roller, and pressure control means for operating the actuating means whereby a relatively high padded roller/concave surface pressure is provided when a workpiece is present and a relatively low roller/concave surface pressure is provided when a workpiece is absent, while maintaining a contiguous relationship between said padded roller and said concave surface.

2. An ironing machine as claimed in claim 1, wherein the actuating means are fluid pressure operated and the pressure control means comprise means for varying said fluid pressure.

3. An ironing machine as claimed in claim 1, wherein the sensing means comprise means operable by contact with a laundry workpiece.

4. An ironing machine as claimed in claim 1, wherein the pressure control means comprise time delay means operable by the sensing means.

5. An ironing machine as claimed in claim 1, wherein the roller is rotatable about a stationary axis and the bed is movable towards and away from said axis.

6. A calendar ironing machine of the type comprising at least one heated ironing bed defining a concave ironing surface cooperating with a padded ironing roller rotatable within the concavity of the surface, comprising actuating means for creating relative movement between the padded roller and the concave surface so as to vary contact pressure therebetween, sensing means for determining the presence or absence of a laundry workpiece en route to the roller, and pressure control means for operating the actuating means whereby a relatively high padded roller/concave surface pressure is provided when a workpiece is present and a relatively low roller/concave surface pressure is provided when a workpiece is absent, the actuating means being fluid pressure operated and the pressure control means comprising means for varying said fluid pressure, said last-mentioned means comprising:

(a) a relatively high fluid pressure source,
(b) a relatively low fluid pressure source, and
(c) means for connecting either the relatively high fluid pressure source or the relatively low fluid pressure souce to the actuating means.

* * * * *